United States Patent
Khanvilkar et al.

(10) Patent No.: US 8,775,609 B2
(45) Date of Patent: Jul. 8, 2014

(54) SERIAL ATTACHED SCSI EXPANDER MANAGEMENT AND ALARM REPORTING USING SNMP

(75) Inventors: Saurabh Balkrishna Khanvilkar, Pune (IN); Mandar D. Joshi, Pune (IN); Kaushalender Aggarwal, Pune (IN)

(73) Assignee: LSI Corporation, San Jose, CA (US)

( * ) Notice: Subject to any disclaimer, the term of this patent is extended or adjusted under 35 U.S.C. 154(b) by 356 days.

(21) Appl. No.: 13/048,971

(22) Filed: Mar. 16, 2011

(65) Prior Publication Data

US 2012/0239843 A1     Sep. 20, 2012

(51) Int. Cl.
*G06F 15/16*     (2006.01)

(52) U.S. Cl.
USPC ............ 709/224; 709/207; 709/250; 709/220

(58) Field of Classification Search
CPC . H04L 41/06; H04L 41/0213; H04L 12/2422; H04L 12/2403
USPC .................. 709/220, 224, 250, 207
See application file for complete search history.

(56) References Cited

U.S. PATENT DOCUMENTS

| | | | | |
|---|---|---|---|---|
| 7,194,538 | B1* | 3/2007 | Rabe et al. | 709/224 |
| 7,644,168 | B2* | 1/2010 | Grieff et al. | 709/229 |
| 7,711,989 | B2* | 5/2010 | Wang et al. | 714/36 |
| 8,024,773 | B2* | 9/2011 | Butler et al. | 726/1 |
| 8,051,334 | B2* | 11/2011 | Jones et al. | 714/43 |
| 8,552,839 | B2* | 10/2013 | Archer et al. | 340/10.42 |
| 8,667,110 | B2* | 3/2014 | Groenendaal et al. | 709/223 |
| 2006/0236198 | A1* | 10/2006 | Lintz et al. | 714/758 |
| 2007/0064623 | A1* | 3/2007 | Brahmaroutu | 370/254 |
| 2007/0299952 | A1* | 12/2007 | Goodman et al. | 709/223 |
| 2009/0125655 | A1* | 5/2009 | Jones et al. | 710/104 |
| 2010/0077075 | A1* | 3/2010 | Cuni et al. | 709/224 |
| 2011/0145452 | A1* | 6/2011 | Schilling et al. | 710/74 |
| 2011/0231571 | A1* | 9/2011 | Joshi et al. | 709/236 |

* cited by examiner

*Primary Examiner* — Douglas Blair
(74) *Attorney, Agent, or Firm* — Alexander J. Neudeck; Cochran Freund & Young LLC

(57) ABSTRACT

Disclosed is a Serial Attached SCSI (SAS) expander. The SAS expander is configured with an Ethernet interface and at least one SAS interface. The Ethernet interface is configured to communicate using TCP/IP protocol. The SAS expander is also configured to send an indicator of an alarm condition using Simple Network Management Protocol (SNMP). The indicator of the alarm condition is sent via the Ethernet interface. Configuration functions and status reads or writes of values stored in the SAS expander, or devices coupled to it may also be exchanged using SNMP.

13 Claims, 6 Drawing Sheets

US 8,775,609 B2

SERIAL ATTACHED SCSI EXPANDER MANAGEMENT AND ALARM REPORTING USING SNMP

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a Serial Attached SCSI (SAS) expander, comprising: an Ethernet interface configured to communicate using TCP/IP protocol, the SAS expander configured to send an indicator of an alarm condition using Simple Network Management Protocol (SNMP), said indicator of said alarm condition to be sent via said Ethernet interface; and, at least one SAS interface.

An embodiment of the invention may therefore further comprise a method of reporting an alarm condition associated with a Serial Attached SCSI (SAS) expander, comprising: receiving an alarm indicator; and, sending an indicator of said alarm using Simple Network Management Protocol (SNMP), said indicator of said alarm condition to be sent via an Ethernet interface of said SAS expander.

DETAILED DESCRIPTION OF THE EMBODIMENTS

Figure 1:
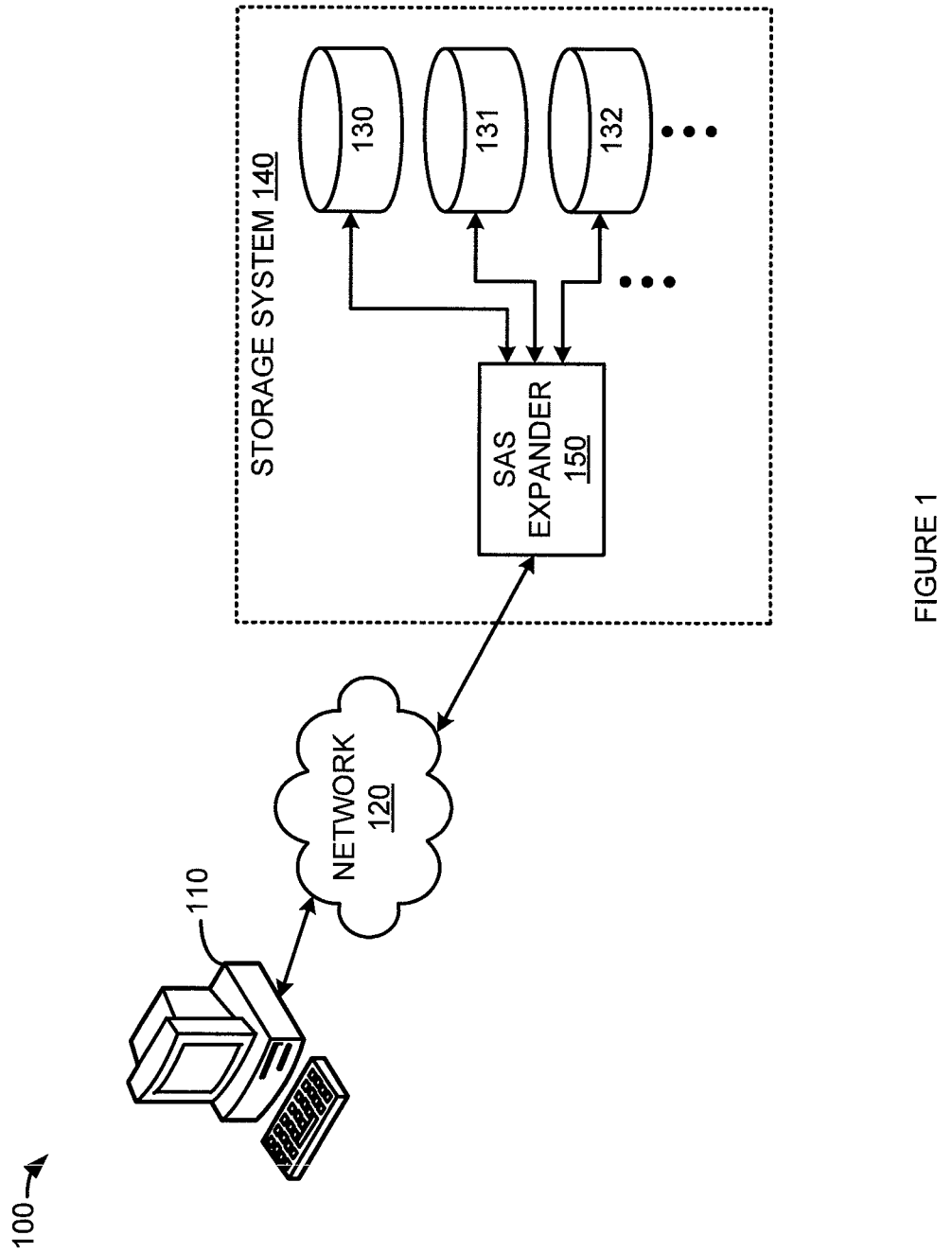
FIG. 1 is a block diagram of a storage management system.

FIG. 1 is a block diagram of a storage management system. In FIG. 1, storage management system 100 comprises computer 110, network 120, and storage system 140. Storage system 140 includes, but is not limited to, SAS expander 150 and disk drives 130-132. Computer 110 is operatively coupled to network 120. SAS expander 150 is operatively coupled to network 120. Disk drives 130-132 are operatively coupled to SAS expander 150. Thus, computer 110 may be operatively coupled to SAS expander 150 and/or disk drives 130-132 via network 120.

Network 120 may be any network or collection of networks that couple, link, or otherwise operatively connect computer 110 with other devices or systems and is also operatively coupled to storage system 140 and SAS expander 150. Network 120 may include other secondary data networks. In an example, network 120 may include a backhaul network, a local network, a long distance network, a packet network, the Internet, or any combination thereof, as well as other types of networks.

In an embodiment, SAS expander 150 includes an Ethernet interface to communicate with network 120. SAS expander 150 may support TCP/IP protocol in order to communicate with network 120. SAS expander 150 may also support performing tasks using the SAS Serial Management Protocol (SMP). In particular, SAS expander 150 may be configured to perform SMP tasks and activities in response to messages received or sent using SNMP protocol. These tasks and activities may be performed in response to SNMP messages received from computer 110 via network 120.

SNMP is a protocol for managing devices in a network. An SNMP managed device (in managed storage system 100, this includes but is not limited to, SAS expander 150) runs an SNMP agent. An SNMP agent which is typically a software module or task which listens for SNMP requests coming from a managing node (in managed storage system 100, this includes, but is not limited to computer 110).

To be SNMP managed, SAS expander 150 defines a Management Information Base (MIB). A MIB is a collection of unique object identifiers (called OIDs) which identify an attribute of a managed device. For example, an attribute could be a data store (e.g., a Vendor Identification string of SAS Expander 150). In another example, an OID can be a logical entity which identifies a functionality (e.g., an OID can be used to cause SAS expander 150 to reset). The MIB can be visualized as a tree structure which should be shared between the manager (computer 110) and the agent. Both the manager and agent should be able to understand the MIB tree in the same manner. However, the manager typically has a larger MIB tree because it may manage many other devices. Once the MIB is defined, the SAS expander 150 can be managed using SNMP primitives. In particular, SAS expander 150 can be managed using, but not limited to, the SNMP-GET and SNMP-SET primitives.

In an embodiment, SAS expander 150 may receive an indicator of an alarm condition. This alarm condition may be received via a SAS interface from a disk drive 130-132. The alarm condition may be generated internally to SAS expander 150. For example, SAS expander 150 may detect an over-temperature condition using an internal sensor. This condition may be reported to computer 110 using SNMP protocol via network 120. Other conditions, internally stored values, registers, and the like may be set or reported by SAS expander 150 to computer 110 using SNMP protocol. Alarm conditions may be reported to computer 110 using a SNMP trap message. SAS expander 150 may be configured to only report certain, predetermined alarm conditions.

By having SAS expander 150 configured to quickly report any alarming conditions which occur on SAS expander 150 (or are reported to SAS expander 150) to computer 110, it allows a system administrator to take quick action. Taking quick action may avoid potentially large financial consequences or losses.

Figure 2:
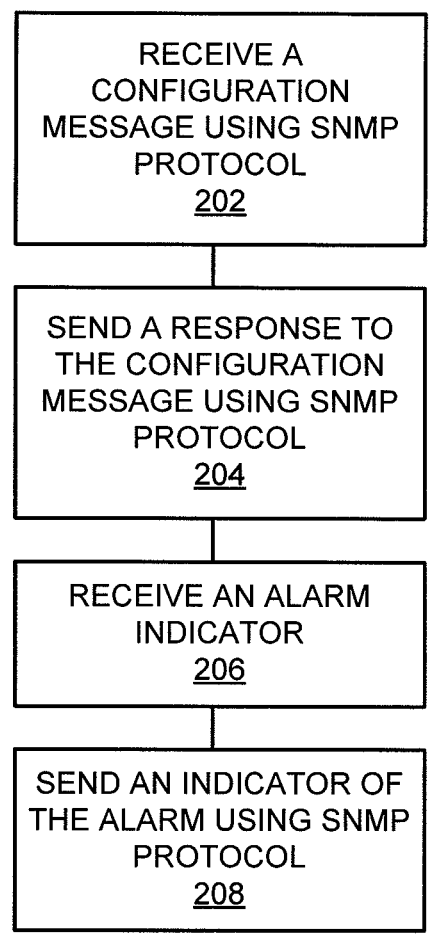
FIG. 2 is a flowchart of a method of managing a storage system.

FIG. 2 is a flowchart of a method of managing a storage system. The steps illustrated in FIG. 2 may be performed by one or more elements of managed storage system 100. A configuration message is received using SNMP protocol (202). For example, SAS expander 150 may receive a configuration message using SNMP protocol via an Ethernet interface coupled to network 120. This configuration message may have been sent from computer 110 using SNMP protocol. This configuration message may have the form of an SNMP SET message. A response to the configuration message is sent (204). For example, SAS expander 150 may send a response message (e.g., success or fail) associated with the received configuration message via its Ethernet interface which is coupled to network 120. This response message may have the form of an SNMP SET response message.

An alarm indicator is received (206). For example, SAS expander 150 may receive an indicator showing that an over-temperature condition exists. In another example, SAS expander 150 may receive, via a SAS interface, and indication that one of disk drives 130-132 is about to fail, or has failed. An indicator of the alarm is sent using SNMP protocol (208). For example, SAS expander 150 may generate an SNMP trap message to inform computer 110 of the alarm indication. It should be understood that the steps shown in FIG. 2 are independent of each other. In particular, steps 202 and 204 may be performed without performing steps 206 and 208, and visa versa.

Figure 3:
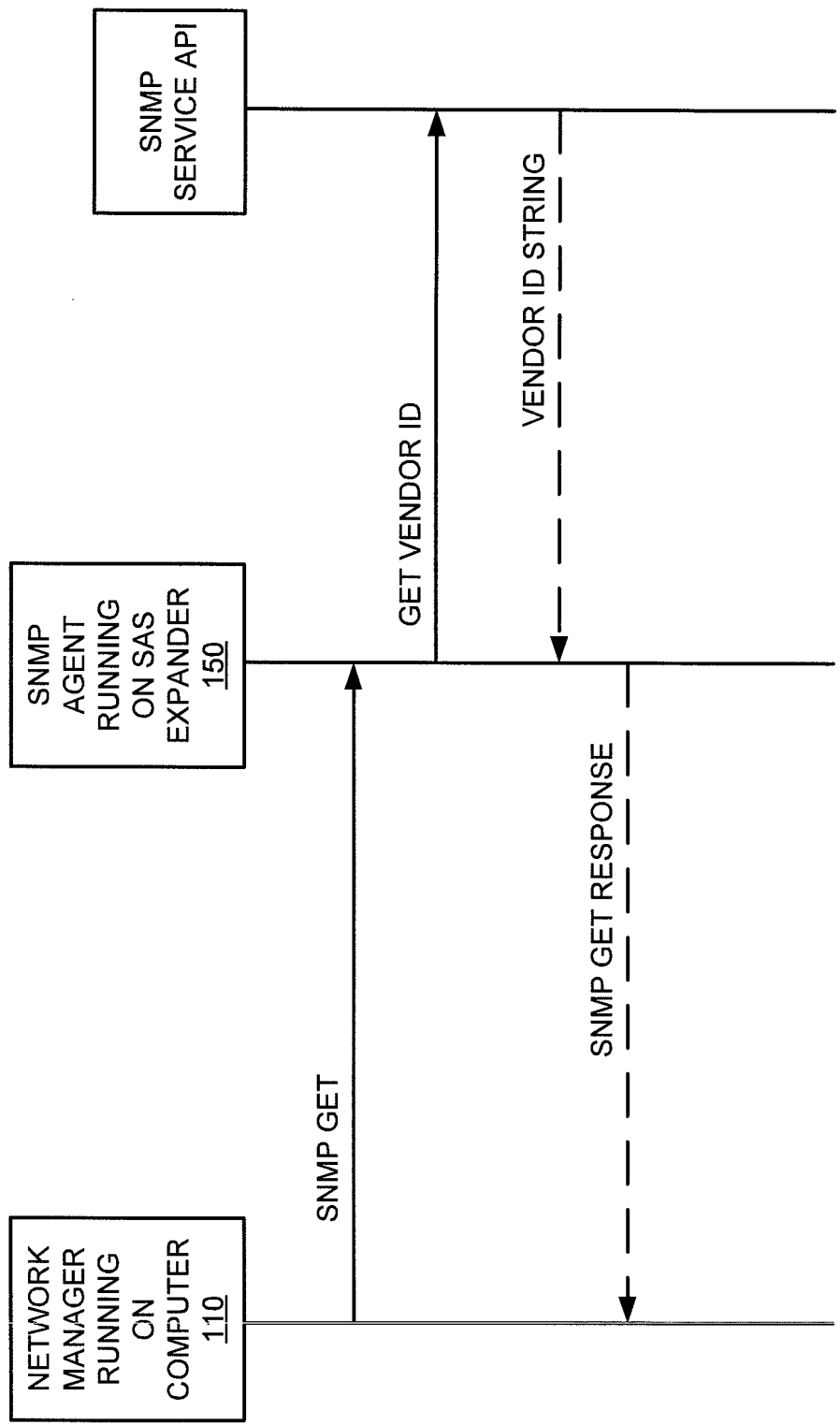
FIG. 3 is a flow diagram illustrating the fetching of a Vendor ID string from a serial attached SCSI (SAS) expander.

FIG. 3 is a flow diagram illustrating the fetching of a Vendor ID string from a serial attached SCSI (SAS) expander. A network manager running on computer 110 sends an SNMP GET message to an SNMP agent running of SAS expander 150. The SNMP GET message may include an OID to retrieve SAS expander 150's Vendor identification. In response, the SNMP agent calls a SNMP service application programming interface (API) to return the vendor identification of SAS expander 150 (e.g., GetVendorID( )). In response, the SNMP service API returns the requested vendor ID string. In response, the SNMP agent sends an SNMP GET response message with the vendor ID string of SAS expander 150 to the network manager running on computer 110.

Figure 4:
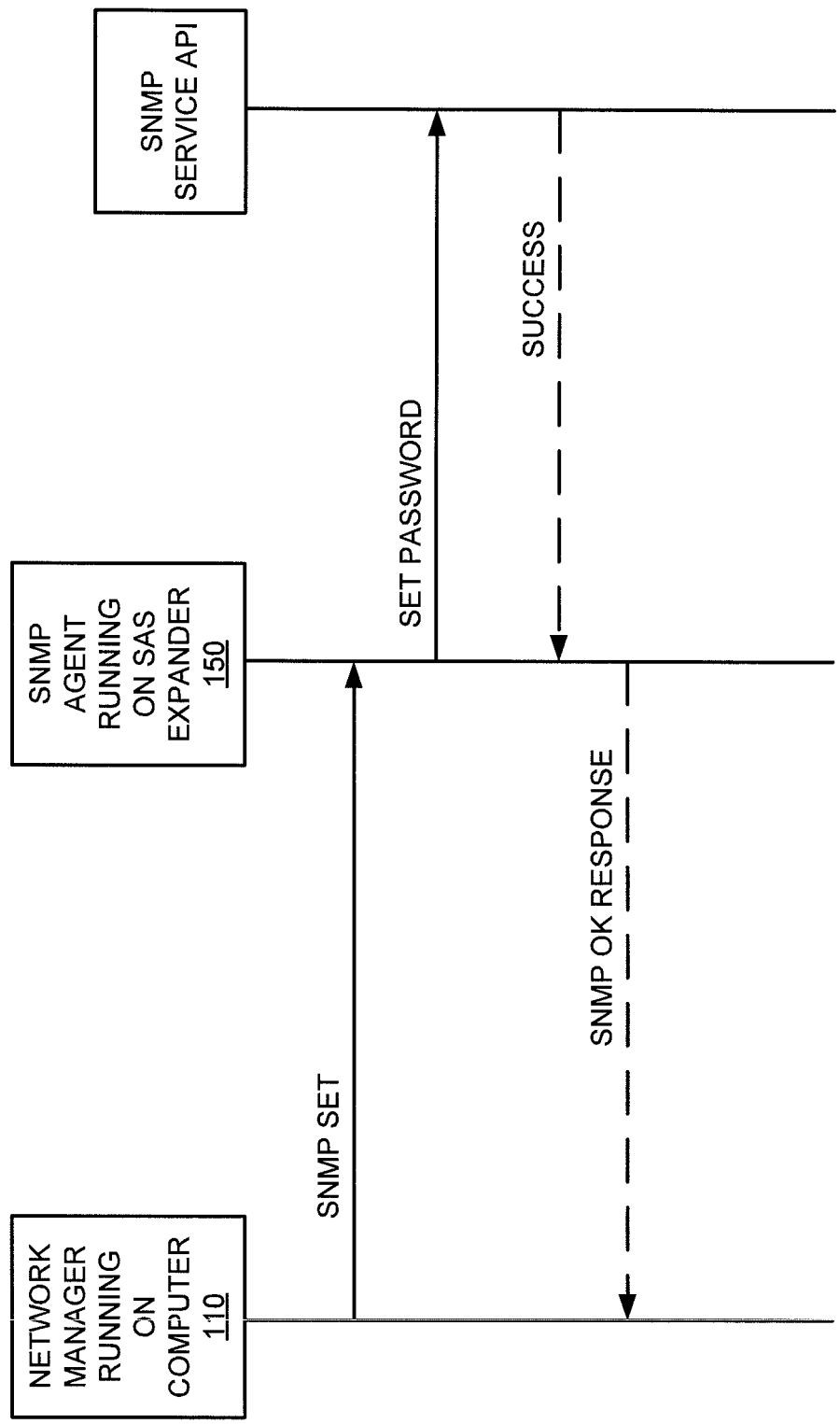
FIG. 4 is a flow diagram illustrating the setting of a password on a SAS expander.

FIG. 4 is a flow diagram illustrating the setting of a password on a SAS expander. A network manager running on computer 110 sends an SNMP SET message to an SNMP agent running of SAS expander 150. The SNMP SET message may include an OID to set a password and a password string. In response, the SNMP agent calls the SNMP service API to set a password of SAS expander 150 (e.g., SetZoneMgrPassword("password")). In response, the SNMP service API returns an indication of the success (or failure) of the API call. In response, the SNMP agent sends an SNMP SET response message indicating the success (or failure) of the SNMP SET request to the network manager running on computer 110.

Figure 5:
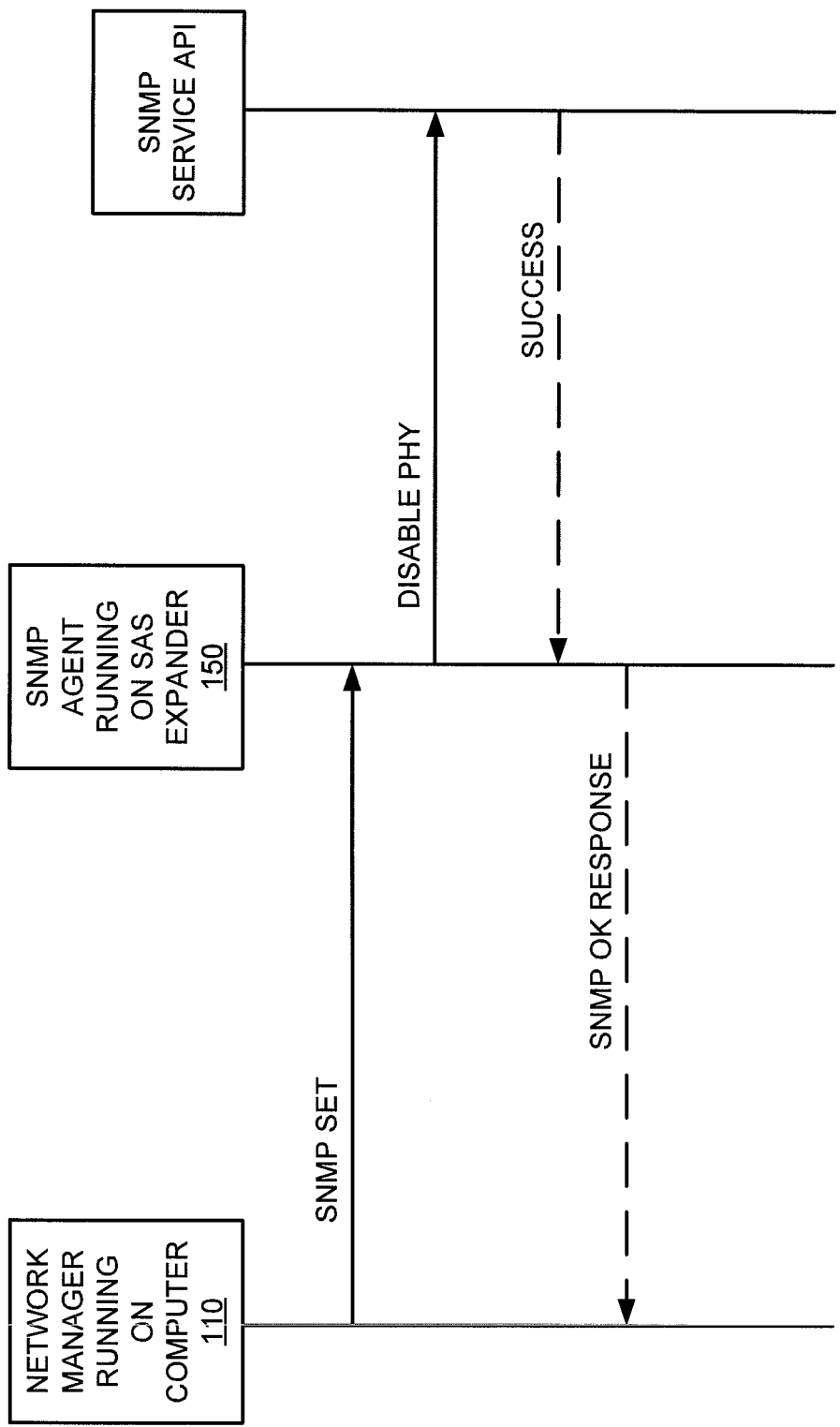
FIG. 5 is a flow diagram illustrating the disabling of a SAS expander physical interface (PHY).

FIG. 5 is a flow diagram illustrating the disabling of a SAS expander physical interface (PHY). A network manager running on computer 110 sends an SNMP SET message to an SNMP agent running of SAS expander 150. The SNMP SET message may include an OID to disable a physical interface and an identifier associated with that interface. In response, the SNMP agent calls the SNMP service API to disable a physical interface of SAS expander 150 (e.g., DisablePhy (PhyID)). In response, the SNMP service API returns an indication of the success (or failure) of the API call. In response, the SNMP agent sends an SNMP SET response message indicating the success (or failure) of the SNMP SET request to the network manager running on computer 110.

The systems, software, computers, expanders, networks, and functions described above may be implemented with or executed by one or more computer systems. The methods described above may be stored on a computer readable medium. Many of the elements of managed storage system 100 may be, comprise, or include computers systems. This includes, but is not limited to computer 110, network 120, storage system 140, SAS expander 150, and disk drives 130-132.

Figure 6:
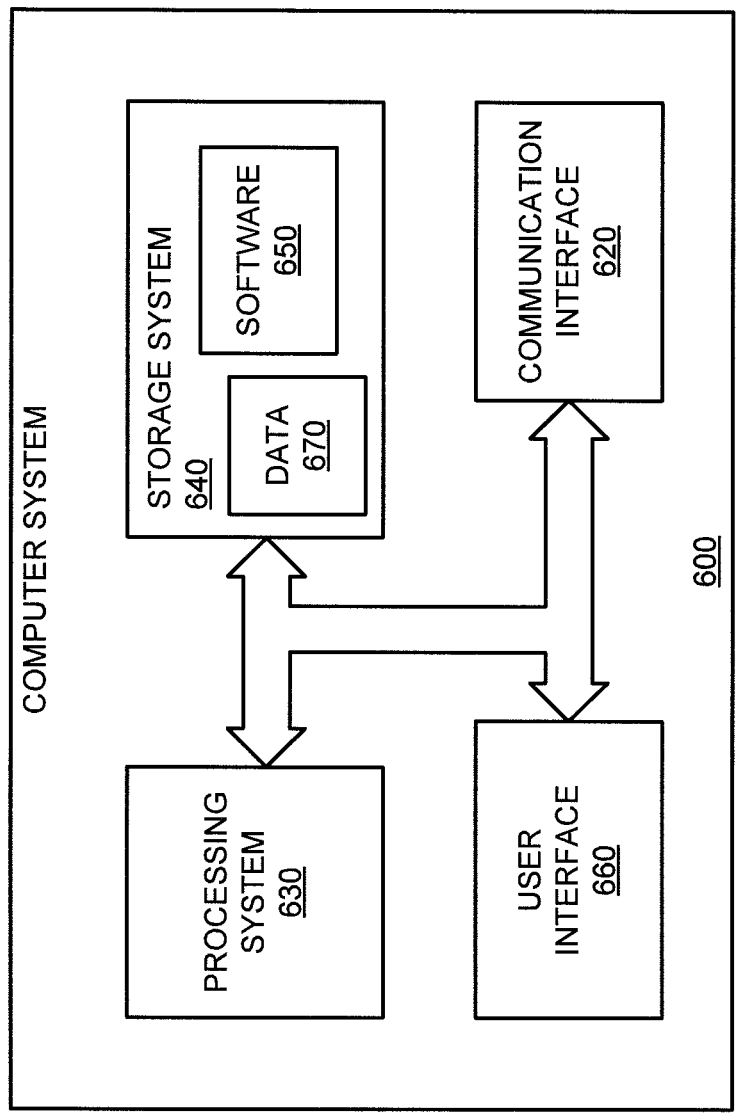
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system may retrieve and store data 670. Processing system may also retrieve and store data via communication interface 620. Processing system 630 may create or modify software 650 or data 670 to achieve a tangible result. Processing system may control communication interface 620 or user interface 660 to achieve a tangible result. Processing system may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A Serial Attached SCSI (SAS) expander, comprising:
a SAS interface, the SAS interface configured to receive an indication that a storage device coupled to the SAS expander is about to fail;
an Ethernet interface configured to communicate using TCP/IP protocol, the SAS expander configured to receive a Simple Network Management Protocol (SNMP) get message that includes an object identifier that causes the SAS expander to retrieve said SAS expanders vendor identification string and send said vendor identification string via a SNMP get response message, the SAS expander further configured to send an indicator of an alarm condition using Simple Network Management Protocol (SNMP), said indicator of said alarm condition to be sent via said Ethernet interface, said indicator of said alarm condition indicating, for said storage device coupled to the SAS expander, an impending failure of the storage device.

2. The SAS expander of claim 1, wherein said indicator of said alarm condition is to be sent using a SNMP trap message.

3. The SAS expander of claim 2, wherein said SAS expander is configured to run an SNMP agent configured to send said SNMP trap message.

4. The SAS expander of claim 1, wherein said SAS expander is further configured to receive an SNMP message that configures at least one variable of said SAS expander.

5. The SAS expander of claim 1, wherein said SAS expander is further configured to send, in response to an SNMP get message, an SNMP message that reports a value stored by said SAS expander.

6. A method of reporting an alarm condition associated with a Serial Attached SCSI (SAS) expander, comprising:
receiving, via an Ethernet interface of said SAS expander, a Simple Network Management Protocol (SNMP) get message that includes an object identifier that causes the SAS expander to retrieve said SAS expanders vendor identification string and send said vendor identification string via a SNMP get response message;
receiving, via a SAS interface of said SAS expander, an indicator from a storage device coupled to said SAS expander that said storage device is about to fail; and,
sending an alarm indicator using Simple Network Management Protocol (SNMP), said indicator of said alarm condition to be sent via said Ethernet interface of said SAS expander, said alarm indicator indicating, for said storage device coupled to the SAS expander, an impending failure of the storage device.

7. The method of claim 6, wherein said indicator of said alarm condition is sent using a SNMP trap message.

8. The method of claim 6, further comprising:
receiving at least one configuration message via an SNMP message received using said Ethernet interface.

9. The method of claim 8, further comprising:
sending at least one response to said configuration message via said Ethernet interface.

10. A non-transitory computer readable medium having instructions stored thereon for reporting an alarm condition associated with a Serial Attached SCSI (SAS) expander that, when executed by a computer, at least instruct the computer to:
receive, via an Ethernet interface of said SAS expander, a Simple Network Management Protocol (SNMP) get message that includes an object identifier that causes the SAS expander to retrieve said SAS expanders vendor identification string and send said vendor identification string via a SNMP get response message;
receive, via a SAS interface of said SAS expander, an indicator, said indicator indicating, for a storage device coupled to the SAS expander, an impending failure of the storage device; and,
send an alarm indicator using Simple Network Management Protocol (SNMP), said alarm indicator to be sent via an Ethernet interface of said SAS expander, said alarm indicator indicating, for said storage device, an impending failure of the storage device.

11. The non-transitory computer readable medium of claim 10, wherein said indicator of said alarm condition is sent using a SNMP trap message.

12. The non-transitory computer readable medium of claim 10, further comprising instructing the computer to:
receive at least one configuration message via an SNMP message received using said Ethernet interface.

13. The non-transitory computer readable medium of claim 12, further comprising instructing the computer to:
send at least one response to said configuration message via said Ethernet interface.

* * * * *